(12) United States Patent
Nolte et al.

(10) Patent No.: US 11,235,343 B2
(45) Date of Patent: Feb. 1, 2022

(54) PORTABLE SPRAY DEVICE

(71) Applicant: BASF SE, Ludwigshafen am Rhein (DE)

(72) Inventors: Marc Nolte, Limburgerhof (DE); Diana Westfalia Moran Puente, Limburgerhof (DE); Steffen Henkes, Limburgerhof (DE); Christian Kepes, Ludwigshafen (DE); Lydia Ludwig, Limburgerhof (DE); Siegfried Doerr, Limburgerhof (DE); Annett Kuehn, Limburgerhof (DE); Raffaello Zito, Limburgerhof (DE); Bernd Stockburger, Ludwigsburg (DE); Rolf Rehkugler, Korb (DE); Juri Mogilewski, Stuttgart (DE)

(73) Assignee: BASF SE, Ludwigshafen (DE)

( * ) Notice: Subject to any disclaimer, the term of this patent is extended or adjusted under 35 U.S.C. 154(b) by 278 days.

(21) Appl. No.: 16/339,111

(22) PCT Filed: Oct. 6, 2017

(86) PCT No.: PCT/EP2017/075479
§ 371 (c)(1),
(2) Date: Apr. 3, 2019

(87) PCT Pub. No.: WO2018/065576
PCT Pub. Date: Apr. 12, 2018

(65) Prior Publication Data
US 2020/0246821 A1    Aug. 6, 2020

(30) Foreign Application Priority Data

Oct. 6, 2016 (EP) ..................... 16192661

(51) Int. Cl.
*B05B 12/00* (2018.01)
*A01M 7/00* (2006.01)
(Continued)

(52) U.S. Cl.
CPC ......... *B05B 12/008* (2013.01); *A01M 7/0046* (2013.01); *B05B 1/3013* (2013.01);
(Continued)

(58) Field of Classification Search
CPC ....... B05B 12/006; B05B 12/008; B05B 9/08; B05B 9/085; B05B 1/3013; B05B 9/0888;
(Continued)

(56) References Cited

U.S. PATENT DOCUMENTS 5,441,180 A    8/1995 Woodruff
5,752,661 A *  5/1998 Lewis .................. B05B 9/0861
                                              222/175
(Continued)

FOREIGN PATENT DOCUMENTS

DE    19612524 A1    10/1997
EP    0462749 B1    5/1995
(Continued)

OTHER PUBLICATIONS

International Search Report, issued in PCT/EP2017/075479, dated Jan. 17, 2018.
(Continued)

*Primary Examiner* — Joseph A Greenlund
*Assistant Examiner* — Juan C Barrera
(74) *Attorney, Agent, or Firm* — Marshall, Gerstein & Borun LLP

(57) ABSTRACT

The present invention relates to a portable spraying device (1) for discharging a fluid, in particular an agricultural formulation, having a container (2) for holding the fluid, a
(Continued)

Figure 1:
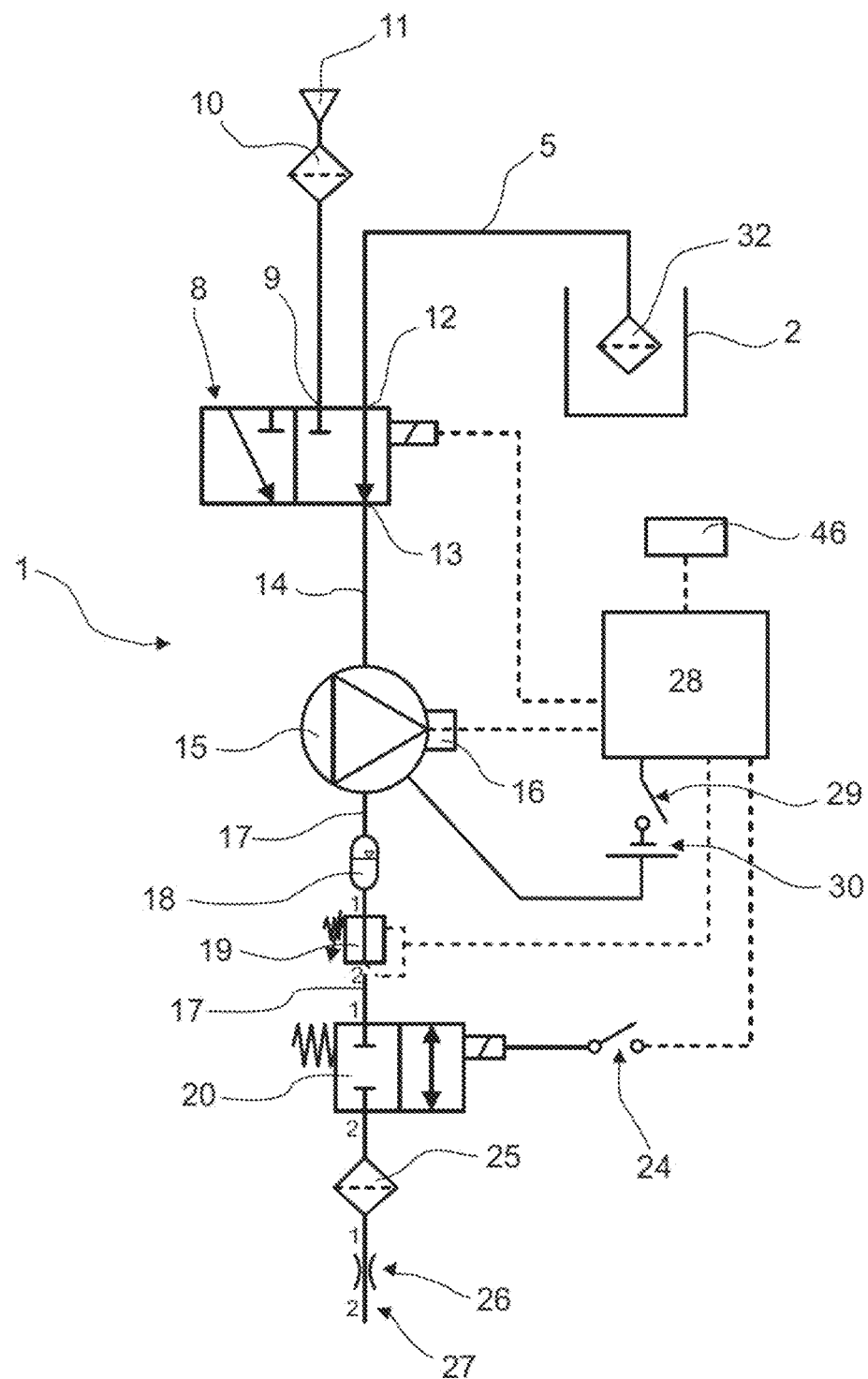

pump (15), which is in fluid connection with the container (2), for pumping the fluid out of the container (2), a spray gun (21), which comprises a spray opening (27) and an electrically controllable application valve (20) for opening and closing a passage to the spray opening (27), an application line (17), which establishes a fluid connection between the pump (15) and the spray gun (21). The spraying device (1) according to the invention is distinguished by a pressure sensor (19), which is arranged in the application line (17), for detecting the fluid pressure in the application line (17), and an electric control device (28), which is coupled to the application valve (20) and the pressure sensor (19) in terms of data transmission, by means of which device an electric control signal for opening the application valve (20) for a certain predetermined time interval and for closing the application valve (20) on expiry of the time interval can be produced in accordance with the fluid pressure detected by means of the pressure sensor (19), with the result that a defined volume of the fluid is discharged via the spray opening (27).

25 Claims, 6 Drawing Sheets

(51) Int. Cl.
| | | |
|---|---|---|
| | *B05B 1/30* | (2006.01) |
| | *B05B 12/02* | (2006.01) |
| | *B05B 12/08* | (2006.01) |
| | *B05B 9/08* | (2006.01) |

(52) U.S. Cl.
CPC ............ *B05B 12/02* (2013.01); *B05B 12/085* (2013.01); *B05B 9/0888* (2013.01)

(58) Field of Classification Search
CPC ......... B05B 7/0012–32; A01M 7/0042; A01M 7/0046
USPC .......................................................... 239/71
See application file for complete search history.

(56) References Cited

U.S. PATENT DOCUMENTS

| | | | |
|---|---|---|---|
| 10,219,515 | B2 | 3/2019 | Mecfel-Marczewski et al. |
| 2002/0008163 | A1* | 1/2002 | Simmons ............. B67D 1/0032 239/407 |
| 2006/0273189 | A1 | 12/2006 | Grimm et al. |
| 2008/0061166 | A1* | 3/2008 | Jacques ................. B05B 7/0037 239/373 |
| 2010/0072301 | A1 | 3/2010 | Cater |
| 2012/0228395 | A1* | 9/2012 | Needham .............. B05B 12/008 239/11 |
| 2014/0191058 | A1 | 7/2014 | Taranta et al. |
| 2016/0008831 | A1* | 1/2016 | Kumar .................... B05B 15/65 239/153 |
| 2018/0206484 | A1 | 7/2018 | Bittner et al. |

FOREIGN PATENT DOCUMENTS

| | | |
|---|---|---|
| EP | 2165770 B1 | 12/2015 |
| WO | 10047800 A2 | 4/2010 |
| WO | 13030071 A1 | 3/2013 |
| WO | 16071331 A1 | 5/2016 |
| WO | 17012930 A1 | 1/2017 |

OTHER PUBLICATIONS

International Preliminary Report on Patentability, issued in PCT/EP2017/075479, dated Sep. 6, 2018.

\* cited by examiner

PORTABLE SPRAY DEVICE

This application is a National Stage application of International Application No. PCT/EP2017/075479, filed Oct. 6, 2017. This application also claims priority under 35 U.S.C. § 119 to European Patent Application No. 16192661.3, filed Oct. 6, 2016.

The present invention relates to a portable spraying device for discharging a fluid, in particular an agricultural formulation. The spraying device comprises a container for holding the fluid. It furthermore comprises a pump, which is in fluid connection with the container, for pumping the fluid out of the container. The spraying device further comprises a spray gun, which comprises a spray opening and an electrically controllable application valve for opening and closing a passage to the spray opening. The spraying device furthermore has an application line, which establishes a fluid connection between the pump and the spray gun.

Discharging liquids by means of a spray bottle is known. In this case, a pumping mechanism acts directly on the liquid, which is expelled through a nozzle. Another known practice in the case of spraying devices is to use a pump mechanism to increase the air pressure in a chamber containing the liquid to be discharged. When a trigger is then actuated, the liquid in the chamber is sprayed out through a nozzle owing to the compressed air in the chamber.

EP 0 462 749 B1 discloses a spray gun which is actuated by means of a hand lever. The spray gun has a connection for a liquid supply, via which pressurized liquids are fed to the spray gun. An outlet nozzle is provided at the outlet end of the spray gun in order to discharge liquid in a certain spray pattern. Between the connection for the liquid supply and the outlet nozzle there is a control valve, which can be opened by means of a trigger.

DE 196 12 524 A1 discloses a spray gun which is designed, in particular, for discharging medium- to high-viscosity liquids, e.g. pasty adhesives. In particular, the substance to be applied is applied over a wide area to a sheet-like structure. The spray gun has a substance feed stub and a substance outlet stub. Arranged in between is a piston chamber, in which a piston can be moved backward and forward. The piston is coupled to a switching lever. By actuating the switching lever, it is possible to close and open the flow through the piston chamber by moving the piston. On the switching lever there is a sensor switch, which is designed as an inductive proximity switch and which switches off the transfer of the substance when the switching lever approaches a predetermined state of proximity. In this case, the driving pressure for the transfer of the substance is removed before the transfer of the substance is cut off. This is intended to prevent a continued flow of material.

U.S. Pat. No. 5,441,180 discloses a spray gun which is designed particularly for discharging plant protection products. This spray gun comprises a reservoir for the plant protection product to be discharged. The spray gun furthermore comprises a pivotable trigger, by means of which a piston can be moved. The movement of the piston reduces the volume in a chamber in which the plant protection product to be discharged is contained, with the result that the plant protection product is discharged. When the trigger is pivoted back again, the piston is moved in the opposite direction, with the result that the volume of the chamber increases. A reduced pressure is thereby produced, sucking the plant protection product back out of the discharge opening.

When discharging or spraying agricultural formulations, especially plant protection products, by means of a spraying device, it is particularly important that the spraying device can be handled safely and in a simple manner. The spraying device should be suitable for mobile use, i.e. it should be easy to carry by one person. It is furthermore particularly important that the fluid to be discharged, i.e. the plant protection product, can be metered very precisely. Finally, it should be possible to apply the plant protection product precisely to a desired area from a particular distance by means of the spraying device. At the same time, it should be ensured during the discharge process that no plant protection product can reach areas which are not supposed to come into contact with the plant protection product. In particular, it should be ensured that it is not possible for the user to come into contact with the plant protection product. Moreover, dripping at the end of the discharge process should be avoided. In particular, the spraying device should also be suitable for the application of gels containing an active compound or active compounds, e.g. gels containing an active compound or active compounds for combating arthropod pests, and should allow targeted application, e.g. in the form of spots or strips/strands. The spray gun should furthermore be insensitive to inconsistencies in the liquid plant protection product of the kind which can occur, for example, when preparing the active compound preparation used for the application while diluting the commercially available active compound concentrates with or in water to the concentration desired for the application.

For this purpose, WO 2013/030071 A1 describes a spray gun and a method for discharging a plant protection product. The spray gun has a fluid chamber, a spray opening, which communicates with the fluid chamber, and a pressure device, which is coupled to the fluid chamber and by means of which a pressure can be exerted on the fluid in the fluid chamber. Arranged at the spray opening is an electrically controllable fluid valve for opening and closing a passage from the fluid chamber to the spray opening. This fluid valve is coupled in terms of data transmission to an electric control device, by means of which an electric control signal for opening the fluid valve for a certain predetermined time interval and for closing the fluid valve on expiry of the time interval can be produced, with the result that a defined volume or defined weight of the fluid is discharged via the spray opening. In one example, the pressure device comprises a cylinder, in which a piston is movably mounted. By means of the piston, the cylinder is divided fluidtightly into a fluid chamber for the fluid to be discharged and a pressure chamber. Compressed air is introduced into the pressure chamber and exerts a force on the cylinder. During this process, a pressure sensor measures the pressure of the compressed air in the pressure chamber. According to another example, a fluid pump is arranged between a fluid chamber, designed as a line, and a fluid reservoir.

In developing the spraying device, there arose the problem with known spraying devices that it ought to be possible to discharge a very small quantity of the agricultural formulation in one shot. At the same time, the volume discharged ought to fluctuate only within very narrow limits, even if the spraying device is used at very different outside temperatures.

It was therefore the underlying object of the invention to provide a spraying device of the type stated at the outset by means of which a very small volume can be discharged in a very precisely metered manner.

According to the invention, this object is achieved by a spraying device having the features of claim 1. Advantageous embodiments and developments will become apparent from the dependent claims.

Thus, the spraying device according to the invention comprises a pressure sensor, which is arranged in the application line, for detecting the fluid pressure in the application line. The spraying device according to the invention furthermore comprises an electric control device, which is coupled to the application valve and the pressure sensor in terms of data transmission, by means of which device an electric control signal for opening the application valve for a certain predetermined time interval and for closing the application valve on expiry of the time interval can be produced in accordance with the fluid pressure detected by means of the pressure sensor, with the result that a defined volume of the fluid is discharged via the spray opening.

It has been found that the fluid pressure which is present in the application line and hence is applied to the application valve is particularly important for the precise metering of the fluid volume discharged. It has furthermore been found that it is only possible to discharge very small fluid volumes at a particular speed only if a particular pressure is present in the application line. By arranging the pressure sensor in the application line, it is possible to ensure that the fluid pressure present in the application line can be detected precisely and that the opening of the application valve can be controlled by the control device in accordance with this fluid pressure.

According to one embodiment of the spraying device according to the invention, the electric control device is coupled to the pump in terms of data transmission. The pump can be controlled by means of the control device in such a way that a predetermined fluid pressure is applied to the application valve when the application valve is closed. With the application valve closed, the fluid pressure is thus regulated. Particularly if the fluid pressure falls below a certain limit, the control device controls the pump in such a way that the fluid pressure is increased. In particular, it is possible to ensure that there is always a certain minimum pressure in the application line.

According to one embodiment of the spraying device according to the invention, the control device comprises a memory for storing a predetermined pressure and a predetermined duration of the time interval. During the spraying operation, the control device then controls the application valve and the pump in such a way that the previously stored pressure is exerted on the fluid during the spraying operation, and the application valve is opened precisely for the stored duration of the time interval.

In particular, the spray gun of the spraying device according to the invention has a trigger, e.g. an electronic, manually actuable trigger, which is coupled to the control device. Through manual actuation of the trigger, the trigger can transmit an electric control signal to the control device and hence initiate a discharge process. By means of the electronic control of the application valve and by means of the electronic trigger for the spray gun, it is possible to design the mechanical structure of the spraying device in a very simple way. As a result, it is possible to achieve a reduction in the weight of the spraying device, this being advantageous particularly in the case of mobile use of the spraying device. Through the electronic control of the application valve, it is ensured that the fluid discharge can be controlled very precisely, this being important especially when discharging plant protection products.

According to a development of the spraying device according to the invention, the application valve can be controlled by means of the control device in such a way that the defined volume of the fluid which is discharged via the spray opening is less than 1 ml. In particular, the fluid volume discharged is less than 0.7 ml, and preferably less than or equal to 0.5 ml. These volumes result in corresponding quantities by weight if a certain density of the fluid is assumed. This volume for the fluid discharge applies, in particular, to a fluid pressure in a range of from 4 bar to 10 bar and a dynamic viscosity of the fluid in a range of from 25 mPa·s to 70 mPa·s at temperatures of between −5° C. and 20° C. and a shear rate of 100 s$^{-1}$. In this case, the viscosity was determined in absolute terms by means of a rheological measurement, e.g. by the CIPAC MT 192; method (Collaborative International Pesticides Analytical Council, Ltd. (CIPAC) Handbook: MT 192 Viscosity of Liquids by Rotational Viscometry; CIPAC, Hatching Green, Harpenden, Hertfordshire, England 2005).

The application valve is of particular importance for the spraying device according to the invention. According to one embodiment of the spraying device according to the invention, the application valve is a shutoff valve with a shutoff body for closing a valve passage. The application valve has a valve spring, which exerts a force on the shutoff body in the direction of a valve seat in order to close the valve passage. As an alternative, the application valve can have a valve spring, which exerts a force on the shutoff body in the direction away from a valve seat in order to open the valve passage. In particular, the valve spring is a leaf spring or a spring disk. The force exerted on the shutoff body by the valve spring can be modified by means of the thickness of the leaf spring or spring disk.

According to a development of the spraying device according to the invention, the application valve has a valve chamber which is in fluid connection with the application line. The shutoff body is arranged relative to the valve chamber and the valve seat in such a way that a fluid pressure on the part of a fluid in the valve chamber presses the shutoff body onto the valve seat. The force exerted by the fluid on the shutoff body acts in particular parallel to the direction of movement of the shutoff body in the direction of the valve seat. In this way, the fluid pressure in the valve chamber supports quick closure of the valve.

In order to be able to discharge small volumes in one shot, the rated size of the application valve is of importance. In the spraying device according to the invention, the application valve can have a rated size in a range of from 0.5 mm to 1.5 mm. Here, the rated size is a nominal size. It defines the diameter of the smallest cross section through which the fluid flows in the application valve. In particular, the cross section is circular, and therefore the smallest cross section of the application valve can also be obtained from the rated size.

According to a preferred development of the spraying device according to the invention, the valve spring of the application valve is designed in such a way that the minimum selectable opening time is in a range of from 10 ms to 60 ms when there is a fluid pressure in a range of from 4 bar to 10 bar at the application valve and the dynamic viscosity of the fluid is in a range of from 25 mPa·s to 70 mPa·s. In this case, the minimum selectable opening time is, in particular, in a range of from 12 ms to 30 ms. Here, the opening time is the time interval from the point in time at which the shutoff body begins to expose the valve passage for the fluid to the point in time at which the shutoff body is seated on the valve seat and completely closes the application valve.

It has surprisingly been found that it was not possible with conventional application valves to achieve sufficiently short opening times with the stated boundary conditions in respect of viscosity and fluid pressure. For this reason, the valve spring of the application valve has been modified in such a way that the desired minimum selectable opening time could be achieved. The valve spring has been made stronger. This means that the force exerted on the shutoff body by the valve spring to close the valve passage has been increased by raising the spring constant of the valve spring. Surprisingly, it has namely been found that, in the case of a conventional application valve, the fluid volume discharged was higher in the indicated range at a higher viscosity. Normally, a higher viscosity of the fluid leads to a lower discharge volume. It has been assumed that too low a spring force in the indicated pressure range leads to the application valve being closed more slowly and hence to a larger fluid volume being discharged. To achieve very small discharge volumes, it is necessary to increase the spring force to enable it to close the shutoff body quickly in the indicated range, even against the higher-viscosity fluid, and hence to enable it to achieve precise metering of a very small fluid volume for discharge. In particular, it is possible according to the invention to choose the spring force of the valve spring of the application valve in accordance with the viscosity of the formulation to be dispensed.

In the spraying device according to the invention, the opening time is determined only by the application valve. Setting the spring constant of the valve spring does not serve for metering, but rather to cut off the fluid flow precisely and quickly in order to achieve a discharge of fluid that is as drip-free as possible. A pressure difference in the case of an open application valve is therefore avoided. This ensures that a high pressure is applied at the spray opening.

According to another embodiment of the spraying device according to the invention, the viscosity of the formulation to be dispensed is detected, and the opening time of the application valve can be controlled by the control device in accordance with the viscosity detected. The viscosity of the formulation to be dispensed can be stored in the control device, for example, wherein it is optionally input beforehand by a user.

It would furthermore be possible to provide, in the container for the fluid, a temperature sensor coupled to the control device. The control device could then calculate the viscosity of the formulation to be dispensed in accordance with the temperature measured by the temperature sensor. The calculation could be performed by means of a table produced beforehand by a calibration process.

According to another embodiment of the spraying device according to the invention, there is therefore arranged in the container a temperature sensor coupled to the control device. The control device is then designed to calculate the viscosity of the formulation to be dispensed in accordance with the temperature measured by the temperature sensor.

According to another embodiment of the spraying device according to the invention, the application valve has at least one electromagnet, by means of which it is possible to exert on the shutoff body a force for opening or closing the application valve counter to the force exerted by the valve spring. Thus, in particular, the application valve is a 2/2-way solenoid valve. Compared with conventional application valves, the coil of the electromagnet is strengthened in this case to enable a greater force to be exerted on the shutoff body, which is pressed against the valve seat or is pressed away from the valve seat by the increased spring force of the valve spring.

In particular, the application valve is an armature valve, preferably a plate armature valve.

According to another embodiment of a spraying device according to the invention, when closing the application valve, the shutoff body exerts on the fluid a pressure which is greater than the predetermined fluid pressure by a factor of at least 1.2, in particular at least 2.

The pressure exerted on the fluid by the shutoff body when closing the application valve must be greater than the predetermined fluid pressure in order to close the application valve. The factor allows for the fact that, at a high viscosity of the fluid, an even higher pressure has to be exerted for closure if short switching times of the application valve are to be achieved. In one example of the spraying device according to the invention, the indicated minimum value for the factor is advantageous for achieving short switching times. However, the factor can vary in accordance with the viscosity of the fluid. In particular, it can additionally be chosen in accordance with the viscosity of the fluid.

According to a development of the spraying device according to the invention, the spray opening is arranged in a hollow-cone nozzle. By means of the hollow-cone nozzle, a defined discharge characteristic of the discharged fluid is produced. Such a discharge characteristic is important particularly when dispensing an agricultural formulation to ensure that the fluid can be sprayed in a targeted manner onto a defined area from a particular distance.

According to one embodiment of the spraying device according to the invention, the distance between the application valve and the spray opening is less than 15 cm, in particular less than 10 cm, and advantageously less than 2 cm. The fluid volume between the spray opening and the application valve is furthermore less than 14 $cm^3$, preferably less than 2.8 $cm^3$, as a further preference less than 1.4 $cm^3$ and, in particular, less than 0.57 $cm^3$. As a particularly preferred option, the application valve is arranged directly at the spray opening. The application valve is thus positioned as close as possible to the spray opening. This makes it possible to prevent dripping of fluid even when viscous or highly viscous fluids are being discharged by means of the spray gun of the spraying device.

In the sense according to the invention, a spray gun is taken to mean an appliance by means of which a fluid is discharged through a spray opening, in particular sprayed, sprinkled or atomized. By means of the spray gun according to the invention, it is possible, in particular, to produce a fluid jet at the outlet.

According to a development of the spraying device according to the invention, the pump is a self-priming pump. This development has the advantage that the pump can deliver both liquid and gas. In this way, it is possible for ambient air to be blown through the lines of the spraying devices to remove all the fluid in the spraying device from a previous discharge process so that it is then possible, for example, to discharge a different fluid, e.g. a different plant protection product, by means of the spraying device according to the invention or to store the spraying device in the empty condition.

The pump can be an electric diaphragm pump, for example. A pump of this kind is very light and has a very low energy requirement. This is advantageous in a portable spraying device since said device has to be carried by the user and, furthermore, it cannot be connected to an external power supply.

Arranged in the pump there is, in particular, a temperature sensor, which detects the temperature of the pump and is coupled to the control device in terms of data transmission. In this way, the control device can switch off the pump when a limit for the temperature of the pump has been exceeded. It is thereby possible to avoid damage to the pump due to an excessive temperature.

According to a development of the spraying device according to the invention, a pulsation damper is arranged in the application line. This pulsation damper smooths the pressure pulses caused by the pump. The pressure sensor is preferably arranged after the pulsation damper in the flow direction. In this way, the pressure sensor can measure the pressure in the application line more accurately and with fewer fluctuations.

According to a development of the spraying device according to the invention, said spraying device has an electrically controllable valve which is arranged between the container and the pump. This valve is coupled to the control device in terms of data transmission, wherein ambient air is drawn in by the pump in a first position of the valve, and fluid is drawn in from the container in a second position of the valve. In particular, the spraying device has a switching device for setting an operating mode of the spraying device.

In a first operating mode, the control device controls the valve in such a way that it is in the first position, with the result that ambient air is pumped through the application line and the spray gun. In this case, the control device furthermore controls the pump and the application valve in such a way that the ambient air is blown continuously through the application line and the spray gun.

In a second operating mode, the control device controls the valve, the pump and the application valve in such a way that the valve is in the second position, in which fluid is drawn in from the container and that fluid is pumped continuously out of the container through the application line and the spray gun. In this way, the application line and the spray gun can be flushed with the fluid or some other liquid.

In a third operating mode, the control device controls the valve in such a way that it is in the second position, i.e. that fluid is drawn in from the container. The pump and the application valve are furthermore controlled in such a way that a defined volume of the fluid is discharged via the spray opening if the pressure sensor detects that the fluid pressure is above a threshold. This third operating mode can be further subdivided into various sub-operating modes, in which various volumes are discharged per shot.

The portable spraying device can furthermore have a battery, which supplies at least the control device and the pump with power. In addition, the battery also supplies the electronic trigger with power to enable said trigger to transmit an actuating signal to the control device. Moreover, all other electronic units of the spraying device can also be supplied with power by this battery.

According to one embodiment of the portable spraying device, the weight of the latter when the container is empty is less than 15 kg, in particular less than 12 kg, and preferably less than 10 kg.

In particular, the spraying device comprises a carrying system designed as a backpack. For example, the carrying system has a hip belt and a holding device for holding at least the container, the control device and the pump. In this arrangement, a bottom edge of the holding device is arranged, in particular, at the same level in the vertical direction as the bottom edge of the hip belt or above the bottom edge of the hip belt. This makes it possible to ensure that the spraying device can be carried comfortably by a user by means of the carrying system.

According to a development of the spraying device according to the invention, the container can be fastened detachably to the spraying device. The spraying device comprises a cap, by means of which a removal opening of the container can be closed fluidtightly. A removal line passes fluidtightly through the cap, wherein the removal line projects with one end into the container and, at the other end, outside the container, has a coupling for coupling to a connecting line. The removal line is thus designed as a riser line. For pressure compensation of the reduced pressure during the suction process, the cap has a ventilation valve, for example.

According to another embodiment of the spraying device according to the invention, the container is held by the spraying device in such a way that the removal opening closed by the cap faces downward, making a riser line unnecessary. In this case, only the coupling for coupling to the connecting line is fastened on an opening of the cap. In this case too, the cap has a ventilation valve for pressure compensation of the reduced pressure during the suction process, for example.

By means of the spraying device according to the invention, it is possible in this way to couple conventional transport containers for the fluid, e.g. for the agricultural formulation, in particular the plant protection product, in a simple manner and without transferring fluid. For example, the transport container is inserted into the holding device of the spraying device, the original cap is removed, and the cap with the coupling and optionally the removal line is placed fluidtightly on the container, being screwed on for example.

If a removal line is used, a weight in the form of a hollow body, in particular a bell-shaped element, can be secured on one end of the removal line, said hollow body sinking to the bottom of the container when the latter is filled with fluid, wherein the hollow body or bell-shaped element has openings or apertures for the passage of the fluid at the bottom, in particular also at the bottom edge. This ensures that, during the use of the spraying device according to the invention, the container is completely emptied while being carried by a user, even if it is not always aligned horizontally with the ground.

In particular, the spray gun of the spraying device according to the invention is designed as a handheld part. It is possible in this case for a fastening device for detachably fastening the application line to an arm of a user to be arranged on the application line. This enables the user to actuate the spray gun, in particular the trigger of the spray gun, with one finger and, at the same time, to point the spray opening in the direction of the desired application area. The fastening device for the application line prevents the application line kinking or being damaged by projecting too far away from the user.

The application line and/or the spray opening, in particular the nozzle in the spray opening, are preferably heatable. In this case, the spraying device can also be used at low temperatures, in particular below 0° C. This prevents the fluid from freezing.

The agricultural formulation for which the spraying device according to the invention is particularly suitable contains, in particular, a plant protection product. Plant protection products are normally used in the form of liquid active compound preparations. These are generally prepared by diluting commercially available active compound concentrates, e.g. suspension concentrates (SC), oil dispersions (OD), capsule dispersions (CS), emulsifiable concentrates (EC), dispersible concentrates (DC), emulsions (EW, EO), suspoemulsion concentrates (SD), solution concentrates (SL), water-dispersible and water-soluble powders (WP and SP), water-soluble and water-dispersible granules (WG, SG), with or in water. In addition, products in the form of active compound solutions which contain the active compound in a concentration suitable for the use, referred to as ULVs, are also employed. Gels containing active compound are furthermore often used to combat arthropod pests, these gels being diluted with water to the desired concentration for use, where appropriate, before being used. Here and below, the terms "agricultural formulation" and "plant protection product" are therefore used both for liquid active compound formulations, including gel formulations containing an active compound or active compounds, with an active compound concentration suitable for the use and for liquid active compound preparations, including diluted gel formulations, which can be obtained by diluting active compound concentrates.

The spraying device according to the invention can be used in many different areas of plant protection, in particular for treating plants, specifically the leaves thereof (leaf application), but also for treating propagatable plant materials (seed). The spraying device according to the invention is also suitable for treating inanimate materials, in particular inanimate organic materials, such as wood, straw, paper, leather, textiles, plastics, or inanimate inorganic materials, such as glass or metal, which have been infested by pest organisms or are to be protected from infestation by pest organisms, such as fungi or insects, with a liquid active compound composition containing one or more suitable active compounds. The spraying device according to the invention is furthermore also suitable for treating living materials, in particular living organic materials, such as wood. In particular, the spraying device can be used to treat cuts in the wood, e.g. on vines in viticulture. In particular, the fluid can be applied in a targeted manner from a short distance to close a cut in the wood.

In particular, the plant protection product is not atomized with the spraying device, as in a conventional use, but is applied in a compact jet to the target area.

In this case, it can be applied to a single point (spot application) or can cover a strip by virtue of forward movement. Owing to the consistency of the plant protection product, the applied quantities adhere to the target area. In particular, therefore, the plant protection product has a viscosity suitable for this purpose.

An example of the spraying device according to the invention is explained in detail below with reference to the drawings.

Figure 2:
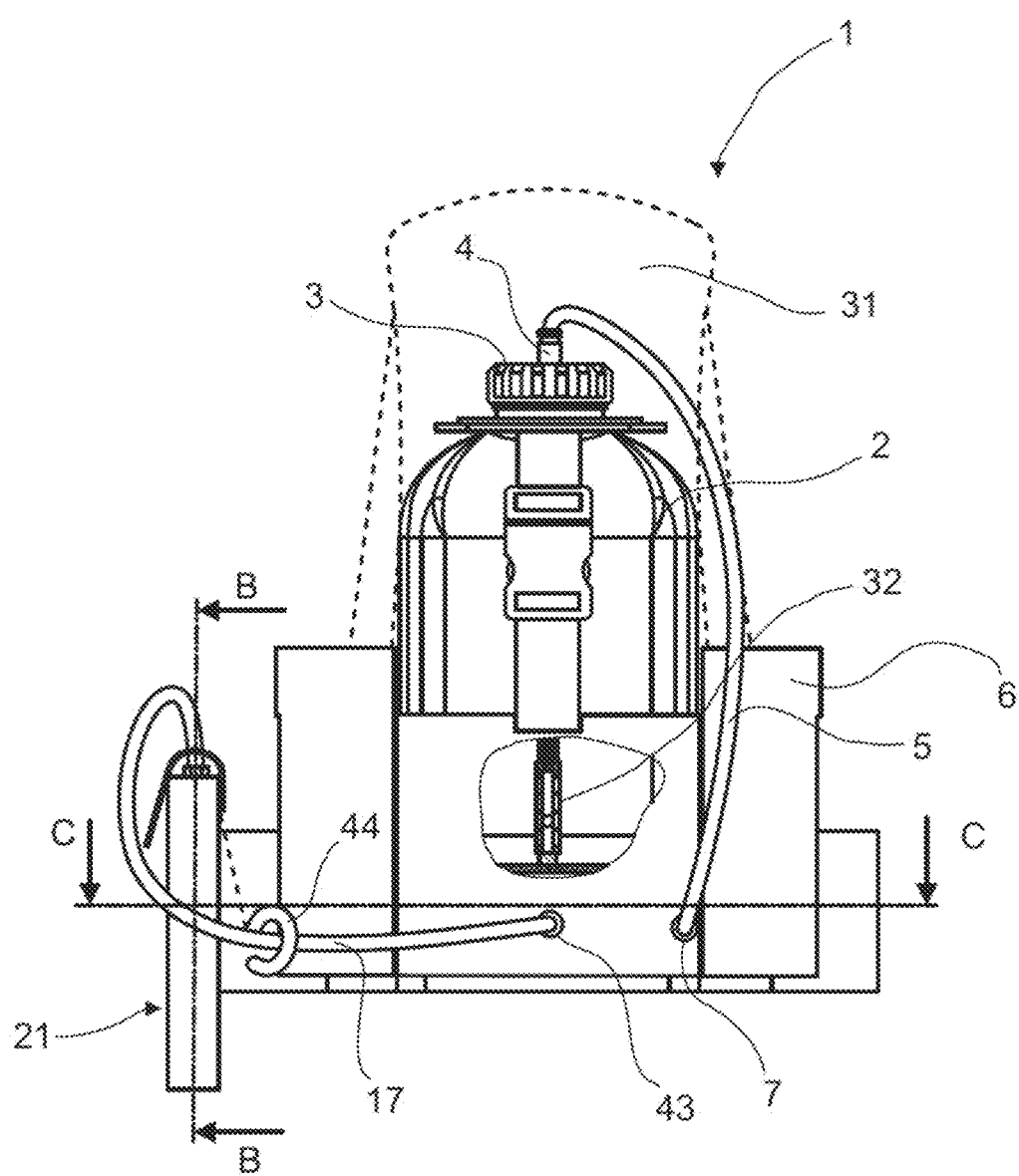
Figure 3:
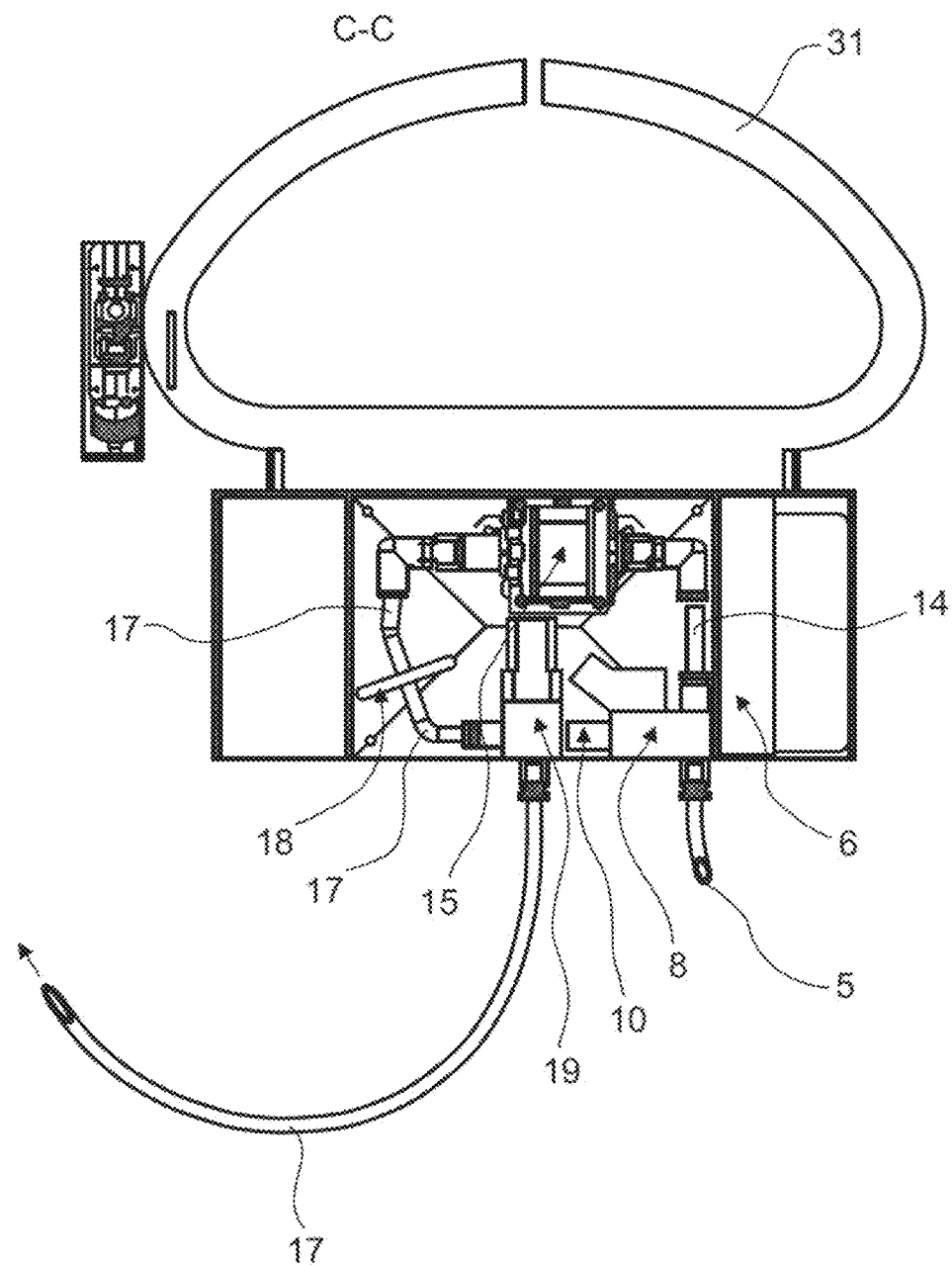
Figure 4:
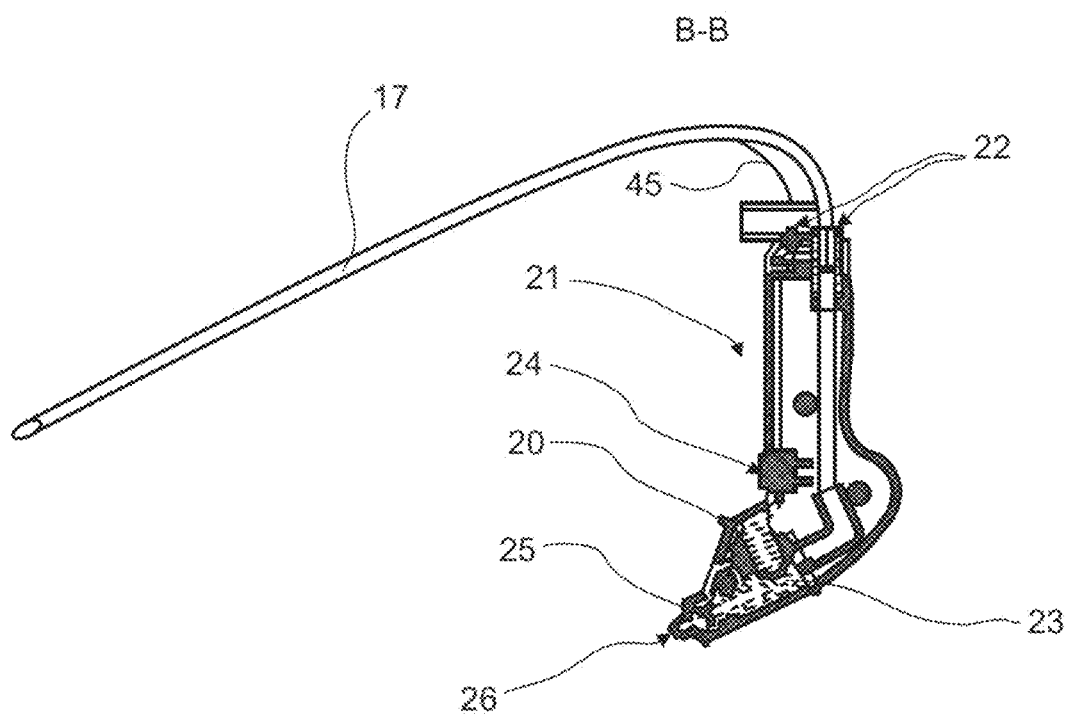
Figure 5:
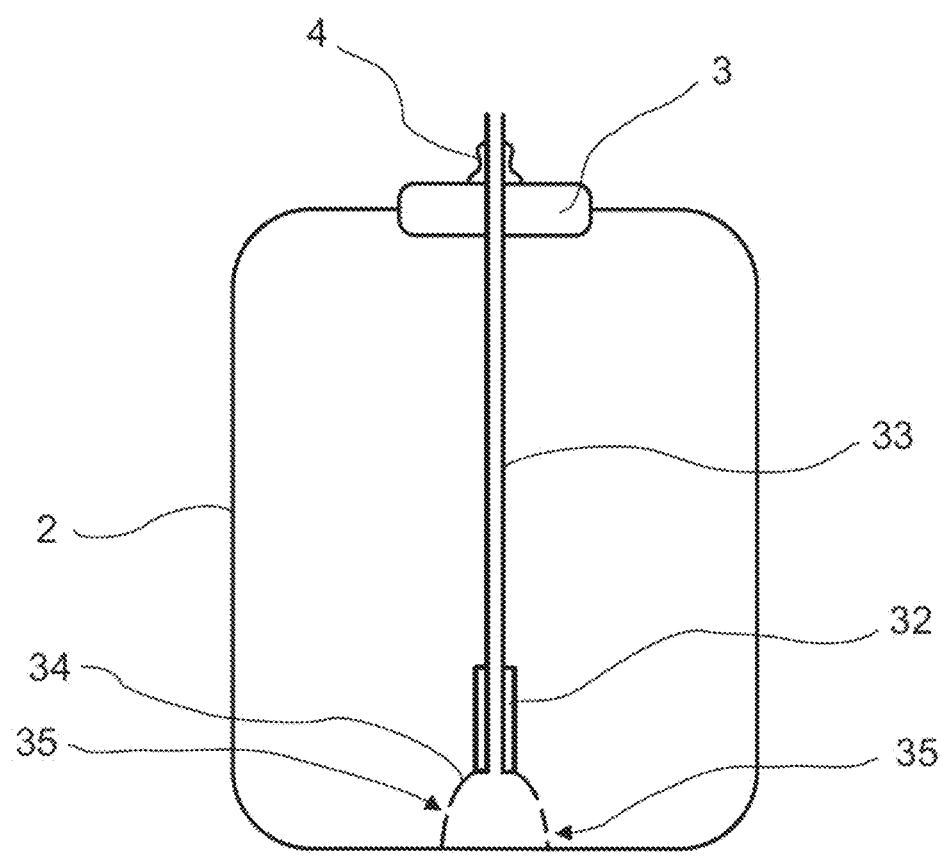
Figure 6:
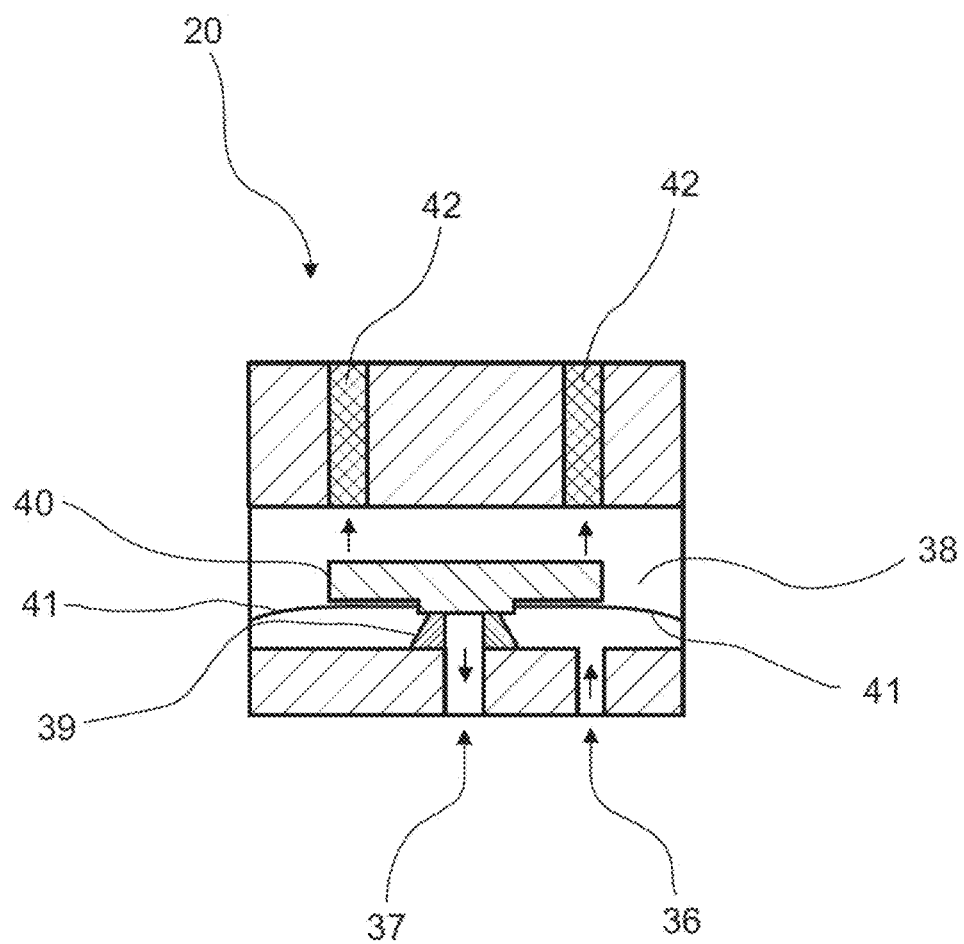

FIG. 1 shows a circuit diagram of one example of the spraying device according to the invention, FIG. 2 shows a view of the example of the spraying device according to the invention from behind, FIG. 3 shows a view of the example of the spraying device according to the invention in a section along the line C-C in FIG. 2, FIG. 4 shows a view of the example of the spraying device according to the invention along the line B-B in FIG. 2, FIG. 5 shows a section through the container of the example of the spraying device according to the invention, and FIG. 6 shows a section through the application valve of the example of the spraying device according to the invention.

As shown in FIGS. 1 and 2, the spraying device 1 according to the invention comprises a container 2 for holding the fluid. It is a conventional transport container of the kind used for plant protection products, for example. However, the cap of the transport container 2 has been unscrewed and replaced by a cap 3 of the spraying device 1. This cap 3 closes a removal opening of the container 2 in a fluidtight manner. The cap 3, in turn, has an opening, through which a removal line designed as a riser line 33 passes. The cap 3 furthermore has a ventilation valve for pressure equalization in the container 2 when fluid has been removed.

The arrangement of the riser line 33 is shown in detail in FIG. 5. Arranged at the end with which the riser line 33 projects into the container 2 is a bell-shaped body 34, which has a plurality of openings 35 and/or apertures. At least one of the openings 35 or apertures is arranged at the bottom edge of the bell-shaped body 34. The bell-shaped body 34 has a density which has the effect that it sinks to the bottom of the container 2 when the container is full. Through the openings 35 or apertures, fluid can then enter the riser line 33 from the lower part or bottom of the container 2 via the bell-shaped body 34 and a filter 32. The riser line 33 then passes through the cap 3 in a fluidtight manner in the direction of delivery of the fluid. A quick-action coupling 4 is provided at the end of the riser line 33 which is arranged outside the container 2.

As shown in FIGS. 1 to 3, a connecting hose 5 is coupled to the quick-action coupling 4. The connecting hose 5 is passed into a housing 6 through an opening 7. In the housing, the connecting hose 5 is connected to a fluid inlet 12 of a 3/2-way valve 8. The valve 8 furthermore has an air inlet 9, which is connected via a filter 10 to an air opening 11, via which ambient air can be drawn in. The valve outlet 13 is connected via a fluid line 14 to a pump 15, which, in the present case, is an electric diaphragm pump. Depending on the position of the valve 8, it is thus possible for fluid to be drawn in from the container 2 or for ambient air to be drawn in via the air opening 11. For this purpose, the pump 15 is of self-priming design, thus allowing it to pump both a liquid and a gas. Given an appropriate position of the valve 8, the pump 15 is in fluid connection with the container 2. It can pump fluid out of the container 2.

Arranged on the pump 15 is a temperature sensor 16, by means of which the temperature of the pump 15 can be measured and by means of which it is possible to prevent the pump 15 from overheating.

Arranged at the outlet of the pump 15 is the first end of an application line 17. Arranged in the application line 17, there is first of all, in the direction of delivery, a pulsation damper 18, which smooths the pressure pulses of the fluid pumped by the pump 15. Arranged after this in the direction of the fluid in the application device 17 there is a pressure sensor 19, which measures the fluid pressure of the fluid in the application line 17.

As shown in FIG. 2, the application line 17 passes out of the housing 6 through an opening 43 after the pressure sensor 19 and is passed to a spray gun 21, which is embodied as a handheld part. Fastened to the application line 17, between the opening 43 and the spray gun 21, is a fastening device 44, by means of which the application line 17 can be fastened detachably to the arm of a user.

The spray gun 21 is shown in detail in FIG. 4. On the inlet side, it has a coupling 22 for connecting the application line 17. An electric lead 45, which is guided on the application line 17, is furthermore coupled to the spray gun 21 via the coupling 22 in terms of data transmission.

In the interior, the spray gun 21 has a valve housing 23 with an application valve 20. The construction of the application valve 20 is explained below in detail. The application valve 20 is electronically controllable and, for this purpose, is connected to the electric lead 45. The inlet of the application valve 20 is connected to the application line 17, which is continued in the spray gun 21. The outlet of the application valve 20 is connected via a filter 25 to a nozzle 26, which has a spray opening 27. The application valve 20 thus opens and closes a passage from the application line 17 to the spray opening 27.

In this example, the nozzle 26 is configured as a hollow-cone nozzle. Moreover, the application valve 20 is arranged very close to the nozzle 26. In the present example, the distance between the nozzle 26 and the application valve 20 is less than 2 cm.

In a different example, it would also be possible for the pressure sensor 19 to be arranged directly ahead of the application valve 20 in the application line 17. In this case, a further connection, in terms of data transmission, would have to be established between the pressure sensor 19 and the control device 28 via the electric lead 45.

The spray gun 21 furthermore comprises an electronic, manually actuable trigger 24, which is also connected to the electric lead 45, but independently of the electric coupling of the application valve 20 to the electric lead 45. To achieve this, the electric lead 45 is of multi-core configuration, for example.

As shown in FIG. 1, the spraying device furthermore comprises a control device 28. It is arranged in the housing 6 and controls the discharge of the fluid. For this purpose, the control device 28 is connected in terms of data transmission to the valve 8, the pump 15 and the temperature sensor 16, the pressure sensor 19 and, via the trigger 24, to the application valve 20. The control device 28 is furthermore coupled in terms of data transmission to a switching device 46 for setting an operating mode.

In this way, the control device 28 can control the position of the valve 8. The pressure sensor 19 can furthermore transmit to the control device 28 the fluid pressure measured in the application line 17. Moreover, the temperature sensor 16 can transmit the measured temperature of the pump 15 to the control device 28. Furthermore, the control device 28 can switch the application valve 20 from a closed state to an open state for a defined time interval or continuously when the trigger 24 is actuated.

Also accommodated in the housing 6 of the spraying device 1 is a battery 30, which supplies all the electric components of the spraying device directly or indirectly with power, as necessary.

The control device 28 is furthermore connected to the pump 5 via a switch 29 actuable by the control device 28 and via the battery 30. By switching the switch 29, the control device 28 can start and stop the pump 15.

As shown in FIGS. 1 and 2, the spraying device 1 furthermore comprises a carrying system 31 designed as a backpack. The carrying system 31 has a holding device for holding the container 2. The container 2 is strapped firmly to the carrying system 31. Moreover, the holding device of the carrying system 31 holds the housing 6 with the components situated therein.

The carrying system has a hip belt. In this arrangement, a bottom edge of the holding device is arranged, in particular, at the same level in the vertical direction as the bottom edge of the hip belt or above the bottom edge of the hip belt.

The weight of the spraying device 1 when the container 2 is empty is less than 15 kg, preferably less than 10 kg, allowing the user to carry the spraying device 1 on his or her back by means of the carrying system 31. In this situation, the application line 17 is fastened to the users arm by means of the fastening device 44 and the user holds the spray gun 21 in his or her hand. With one finger, the user can then actuate the trigger 24 and point the nozzle 26 in the direction of the application area.

The application valve 20 is explained in detail below with reference to FIG. 6:

In the present example, the application valve 20 is a shutoff valve, which is designed as a plate armature valve. It has a fluid inlet 36 and a fluid outlet 37. Via the fluid inlet 36, fluid enters the valve chamber 38. The latter is in fluid connection with the application line 17. A valve seat 39, which surrounds an opening leading to the fluid outlet 37, is formed centrally in the valve chamber 38. A shutoff body 40, which is designed as a plate armature, is arranged movably within the valve chamber 38. The shutoff body 40 is arranged relative to the valve chamber 38 and the valve seat 39 in such a way that a fluid pressure on the part of a fluid in the valve chamber 38 presses the shutoff body 40 onto the valve seat. The force exerted by the fluid on the shutoff body acts in particular parallel to the direction of movement of the shutoff body 40 in the direction of the valve seat 39. The fluid pressure acts in the direction of closing of the application valve.

The shutoff body 40 is connected to a valve spring 41. The valve spring 41 is designed as a disk-shaped leaf spring or spring disk. It is connected to the housing of the application valve 20 and to the shutoff body 40 in such a way that it exerts a force on the shutoff body 40 in the direction of the valve seat 39.

Thus, the valve spring 41 presses the shutoff body 40 against the valve seat 39, ensuring that the passage from the valve chamber 38 to the fluid outlet 37 is sealed off.

The application valve 20 furthermore comprises one or more electromagnets with magnet coils 42, which are connected via the electric lead 45 to the control device 28 and the battery 30. By means of the control device 28, it is possible in this way to apply a voltage across the magnet coils 42, which then generate a magnetic field that exerts a force on the shutoff body 40 which is counter to the force exerted by the valve spring 42. For this purpose, the shutoff body 40 is composed of a ferromagnetic material.

If there is no voltage across the magnet coils 42, the application valve 20 is thus closed. When there is a voltage across the magnet coils 42, the shutoff body 40 is raised from the valve seat 39 by the magnetic field generated by the magnet coils 42, with the result that the application valve 20 is opened. In this case, fluid can flow from the fluid inlet 36 into the valve chamber 38 and, from there, to the fluid outlet 37. If the magnet coils 42 are then separated from the power supply, with the result that there is no longer a voltage across the magnet coils 42, the force exerted by the valve spring 41 moves the shutoff body 40 back in the direction of the valve seat 39 and closes the application valve 20 again. The time required by the application valve 20 to close depends, on the one hand, on the spring constant of the valve spring 41 and, on the other hand, on the viscosity of the fluid in the valve chamber 38. It has been found here that very short closing times for the application valve 20 can be achieved only if the spring force exerted by the valve spring 41 on the shutoff body 40 is high when viscous fluids are used. Thus, it is also only in this case that opening times of the application valve 20 which are only very short can be achieved.

As an alternative, the valve spring 41 can conversely also be connected to the housing of the application valve 20 and the shutoff body 40 in such a way that it exerts a force on the shutoff body 40 in the direction away from the valve seat 39. The valve spring 41 then presses the shutoff body 40 away from the valve seat 39, with the result that the passage from the valve chamber 38 to the fluid outlet 37 is opened. If in this case there is no voltage across the magnet coils 42, the application valve 20 is opened, provided that the force exerted by the fluid does not exceed the force exerted by the valve spring 41. If there is voltage across the magnet coils 42, the shutoff body 40 is pressed against the valve seat 39 by the magnetic field generated by the magnet coils 42, with the result that the application valve 20 is closed.

Here, the viscosity of the fluid is in a range of from 25 mPa·s to 70 mPa·s, measured at a temperature of between −5° C. and 20° C. and a shear rate of 100 s$^{-1}$. In this case, the low viscosities in this range occur at the higher temperatures, whereas the higher viscosities of the range occur at the lower temperatures.

The viscosity of an agricultural formulation for which the spraying device 1 according to the invention is suitable was determined, for example, by the CIPAC MT 192 method (Collaborative International Pesticides Analytical Council, Ltd. (CIPAC) Handbook: MT 192 Viscosity of Liquids by Rotational Viscometry; CIPAC, Hatching Green, Harpenden, Hertfordshire, England 2005), in which a Kinexus-series rotational viscosimeter made by Malvern was used. The viscosimeter is fitted with a plate measurement system. In the measurement process, the fluid was poured onto the measurement system and a waiting time of 30 seconds was observed, until a defined test temperature had been established. Shear forces were then exerted, and in this way the viscosity was measured. In this case, the following viscosities were obtained at a shear rate of 100 s$^{-1}$: 30° C.: 19 mPa·s; 25° C.: 21 mPa·s; 20° C.: 23 mPa·s; 15° C.: 26 mPa·s; 10° C.: 30 mPa·s; 5° C.: 34 mPa·s; 0° C.: 41 mPa·s; −5° C.: 48 mPa·s; −10° C.: 60 mPa·s.

The spring constant of the valve spring 41 was then chosen so that the minimum selectable opening time of the application valve 20 is in a range of from 10 ms to 40 ms, in particular from 20 ms to 30 ms. These switching times were achieved at a fluid pressure of 6 bar. For this purpose, the chosen thickness of the valve spring, designed as a spring disk, was 0.4 mm. To ensure that the force exerted by the valve spring 41 as a result can be overcome by the magnet coils 42, the chosen resistance of the magnet coils 42 was lower in order to increase the force exerted by the magnetic field on the shutoff body 40. According to the invention, it was thereby possible to achieve the desired very short opening times of the application valve 20, even in the case of a fluid, even when the viscosity of the fluid is in the indicated range. The spring constant of the valve spring 41 is thus matched to the viscosity of the fluid which is to be discharged by the spraying device 1.

The rated size of the application valve 20 is in a range of from 0.5 mm to 1.5 mm, and, in the present example, the nominal size was 1 mm. This ensured that the fluid volume discharged in a shot discharged by the spraying device 1 was less than or equal to 1 ml at a fluid pressure in a range of from 4 bar to 10 bar and the abovementioned dynamic viscosity of the fluid.

Since only a very small fluid volume is discharged per shot, there is only a very small pressure drop in the application line 17 after a shot. Thus, it is only very seldom that the pump 15 has to run to build up the target pressure. For this reason, the energy consumption of the pump 15 is very low, and therefore the battery 30 can be of relatively small dimensions. This has the advantage that the portable spraying device 1 can be made very light.

The operation of the spraying device 1 and, in conjunction therewith, further details of the spraying device 1 are explained below:

First of all, the user sets the operating mode of the spraying device 1 by means of the switching device 46. In a first operating mode, ambient air is to be blown through the spraying device 1. In this case, the control device 28 controls the valve 8 in such a way that the air inlet 9 is connected to the valve outlet 13. When the user then actuates the trigger 24, the control device 28 controls the pump 15 in continuous mode by continuous closure of the switch 29. The application valve 20 is furthermore switched to an open position for as long as the trigger 24 is actuated by the user. Thus, ambient air is drawn in via the air opening 11 and blown through the application line 17, the application valve 20 and the nozzle 26. As soon as the user is no longer actuating the trigger 24, the pump 15 stops and the application valve 20 closes.

The user can furthermore select a second operating mode by means of the switching device 46. In this case, the control device 28 controls the valve 8 in such a way that the fluid inlet 12 is connected to the valve outlet 13. When the user actuates the trigger 24, the control device 28 controls the pump 15 in such a way that it runs in continuous mode. The application valve 20 is furthermore open for as long as the user actuates the trigger 24. In this case, fluid is drawn in from the container 2 via the filter 32 and pumped through the application line 17 by means of the pump 15 and discharged at the nozzle 26. This second operating mode serves to flush the spraying device 1. During flushing, the temperature sensor 16 measures the temperature of the pump 15 and transmits the measured value intermittently to the control device 28. If the temperature measured by the temperature sensor 16 exceeds a permitted limit, the control device 28 switches the pump 15 off.

If, after flushing, the user wants to use the spraying device 12 for spraying a small quantity of fluid onto an application area, e.g. a pruned vine, the user selects the third operating mode at the switching device 46. In the third operating mode, there is additionally a choice of various quantities by weight of the fluid or fluid volumes which are discharged in one shot. Depending on the setting at the switching device 46, it is possible to specify that 0.15 g or 0.2 g or 0.25 g or 0.3 g of fluid or the volumes resulting therefrom at a certain density are discharged in each shot, for example.

In this third operating mode, the control device 28 controls the valve 8 in such a way that the fluid inlet 12 is in fluid connection with the valve outlet 13, with the result that fluid in the container 2 can be drawn in. The control device 28 furthermore controls the pump 15 in such a way that a certain fluid pressure is present in the application line 17. If the pressure measured by the pressure sensor 19 and transmitted to the control device 28 is less than this pressure, which can be 6 bar for example, the control device 28 switches the pump 15 on briefly until the fluid pressure present in the application line 17 corresponds to the target pressure of, in this case, 6 bar.

The arrangement of the pressure sensor 19 in the application line 17 ensures that there is always a defined fluid pressure, controllable by the control device 28, at the inlet of the application valve 20.

If the user actuates the trigger 24 before this target pressure is present in the application line 17, the control device 28 prevents the application valve 20 being opened. However, if the target pressure of 6 bar is present in the application line 17, the application valve 20 is opened for a predetermined time interval, which is stored in the control device 28, when the trigger 24 is actuated, and it is closed again on expiry of this time interval. As an alternative, a target pressure range or a minimum target pressure can also be stored in the control device 28. In this case, the application valve 20 is opened when the trigger 24 is actuated if the measured pressure is in the target pressure range or above the minimum target pressure.

Via the nozzle 26, a shot is then discharged, during which a precisely defined quantity by weight or a precisely defined volume of the fluid is discharged via the spray opening 27. The length of the time interval can be 28 ms, for example, wherein 0.3 g of fluid is discharged in this time interval, for example. If the user has selected a different fluid volume for the discharge at the switching device 46, the time interval, selected by the control device 28, for which the application valve 20 opens upon actuation of the trigger 24 is correspondingly different. The respective opening times are stored in a memory of the control device 28. They have been determined in advance for the fluid pressure and for a particular viscosity by means of a calibration process. The temperatures can vary in a range of from −5° C. to 20° C.

In another example, the control device 28 can also calculate the viscosity of the fluid by measuring the external temperature or the temperature in the container 2, and can then determine the time interval in accordance with the calculated viscosity of the fluid in each case.

LIST OF REFERENCE SIGNS 1 spraying device
2 container
3 cap
4 quick-action coupling
5 connecting hose
6 housing
7 opening
8 valve
9 air inlet
10 filter
11 air opening
12 fluid inlet
13 valve outlet
14 fluid line
15 pump
16 temperature sensor
17 application line
18 pulsation damper
19 pressure sensor
20 application valve
21 spray gun
22 coupling
23 valve housing
24 trigger
25 filter
26 nozzle
27 spray opening
28 control device
29 switch
30 battery
31 carrying system
32 filter
33 riser line, removal line
34 bell-shaped body
35 openings
36 fluid inlet
37 fluid outlet
38 valve chamber
39 valve seat
40 plate armature. Shutoff body
41 valve spring
42 magnet coils
43 opening
44 fastening device
45 electric lead
46 switching device

The invention claimed is:

1. A portable spraying device for discharging a fluid, the portable spraying device comprising:
a container for holding the fluid,
a pump, which is in fluid connection with the container, for pumping the fluid out of the container,
a spray gun, which comprises a spray opening and an electrically controllable application valve for opening and closing a passage to the spray opening,
an application line, which establishes a fluid connection between the pump and the spray gun,
a pressure sensor, which is arranged in the application line, for detecting the fluid pressure in the application line,
an electric control device, which is coupled to the application valve and the pressure sensor in terms of data transmission, wherein the electric device is adapted to deliver an electric control signal for opening the application valve for a certain predetermined time interval and for closing the application valve on expiry of the time interval in accordance with the fluid pressure detected by means of the pressure sensor, with the result that a defined volume of the fluid is discharged via the spray opening, and
an electrically controllable valve, which is arranged between the container and the pump, and which is coupled to the control device in terms of data transmission, wherein ambient air is drawn in by the pump in a first position of the valve, such that ambient air passes through the valve; and fluid is drawn in from the container in a second position of the valve, such that fluid passes through the valve;
wherein the application valve is a shutoff valve with a shutoff body for closing a valve passage and the application valve has a valve spring which exerts a force on the shutoff body in the direction of a valve seat in order to close the valve passage or which exerts a force on the shutoff body in the direction away from the valve seat in order to open the valve passage,
wherein the application valve has a valve chamber which is in fluid connection with the application line, and
wherein the shutoff body is arranged relative to the valve chamber and the valve seat in such a way that a fluid pressure on the part of a fluid in the valve chamber presses the shutoff body onto the valve seat.

2. The portable spraying device of claim 1, wherein the electric control device is coupled to the pump in terms of data transmission, and the pump can be controlled by means of the control device in such a way that a predetermined fluid pressure is applied to the application valve when the application valve is closed.

3. The portable spraying device of claim 1, wherein the application valve can be controlled by means of the control device in such a way that the defined volume of the fluid which is discharged via the spray opening is less than 1 ml.

4. The portable spraying device of claim 1, wherein the valve spring is a leaf spring or a spring disk.

5. The portable spraying device of claim 1, wherein the application valve has a rated size in a range of from 0.5 mm to 1.5 mm.

6. The portable spraying device of claim 1, wherein the valve spring of the application valve is designed in such a way that the minimum selectable opening time is in a range of from 10 ms to 60 ms when there is a fluid pressure in a range of from 4 bar to 10 bar at the application valve and the dynamic viscosity of the fluid is in a range of from 25 mPa·s to 70 mPa·s.

7. The portable spraying device of claim 1, wherein the viscosity of the formulation to be dispensed can be detected and the opening time of the application valve can be controlled by the control device in accordance with the viscosity detected.

8. The portable spraying device of claim 7, wherein there is arranged in the container a temperature sensor coupled to the control device, and the control device is designed to calculate the viscosity of the formulation to be dispensed in accordance with the temperature measured by the temperature sensor.

9. The portable spraying device of claim 1, wherein the application valve has at least one electromagnet, by means of which it is possible to exert on the shutoff body a force for opening or closing the application valve counter to the force exerted by the valve spring.

10. The portable spraying device of claim 1, wherein the application valve is a plate armature valve.

11. The portable spraying device of claim 1, wherein, when closing the application valve, the shutoff body exerts on the fluid a pressure which is greater than the predetermined fluid pressure by a factor of at least 1.2.

12. The portable spraying device of claim 1, wherein the spray opening is arranged in a hollow-cone nozzle.

13. The portable spraying device of claim 1, wherein the pump is a self-priming pump.

14. The portable spraying device of claim 1, wherein the pump is an electric diaphragm pump.

15. The portable spraying device of claim 1, wherein a pulsation damper is arranged in the application line.

16. The portable spraying device of claim 1, wherein the spraying device has a switching device for setting an operating mode of the spraying device.

17. The portable spraying device of claim 16, wherein the control device is designed, in a first operating mode, to control the valve in such a way that it is in the first position, with the result that ambient air is pumped through the application line.

18. The portable spraying device of claim 16, wherein the control device is designed, in a second operating mode, to control the valve in such a way that it is in the second position, in which fluid is drawn in from the container, and that fluid is pumped continuously out of the container through the application line.

19. The portable spraying device of claim 16, wherein the control device is designed, in a second operating mode, to control the valve in such a way that it is in the second position, in which fluid is drawn in from the container, and to control the pump and the application valve in such a way that a defined volume of the fluid is discharged via the spray opening if the pressure sensor detects that the fluid pressure is above a threshold.

20. The portable spraying device of claim 1, wherein the weight of the spraying device when the container is empty is less than 15 kg.

21. The portable spraying device of claim 1, wherein the spraying device comprises a carrying system designed as a backpack.

22. The portable spraying device of claim 1, wherein the container can be fastened detachably to the spraying device, and the spraying device comprises a cap, by means of which a removal opening of the container can be closed fluid tightly, wherein a removal line passes fluid tightly through the cap, projecting with one end into the container and, at the other end, outside the container, having a coupling for coupling to a connecting line.

23. The portable spraying device of claim 22, wherein the container is held by the spraying device in such a way that the removal opening closed by the cap faces downward.

24. The portable spraying device of claim 1, wherein the spray gun is designed as a handheld part, and a fastening device for detachably fastening the application line to an arm of a user is arranged on the application line.

25. A portable spraying device for discharging a fluid, the portable spraying device comprising:
a container for holding the fluid,
a pump, which is in fluid connection with the container, for pumping the fluid out of the container,
a spray gun, which comprises a spray opening and an electrically controllable application valve for opening and closing a passage to the spray opening,
an application line, which establishes a fluid connection between the pump and the spray gun,
a pressure sensor, which is arranged in the application line, for detecting the fluid pressure in the application line,
an electric control device, which is coupled to the application valve and the pressure sensor in terms of data transmission, wherein the electric device is adapted to deliver an electric control signal for opening the application valve for a certain predetermined time interval and for closing the application valve on expiry of the time interval in accordance with the fluid pressure detected by means of the pressure sensor, with the result that a defined volume of the fluid is discharged via the spray opening, and
an electrically controllable valve, which is arranged between the container and the pump, and which is coupled to the control device in terms of data transmission, wherein ambient air is drawn in by the pump in a first position of the valve, such that ambient air passes through the valve; and fluid is drawn in from the container in a second position of the valve, such that fluid passes through the valve.

\* \* \* \* \*